United States Patent
Burmeister et al.

(10) Patent No.: US 8,460,837 B2
(45) Date of Patent: Jun. 11, 2013

(54) SEALING DEVICE FOR A FUEL CELL ARRANGEMENT

(76) Inventors: Uwe Burmeister, Munich (DE); Wolfgang Wagner, Neubiberg (DE)

( * ) Notice: Subject to any disclaimer, the term of this patent is extended or adjusted under 35 U.S.C. 154(b) by 538 days.

(21) Appl. No.: 12/530,953

(22) PCT Filed: Mar. 6, 2008

(86) PCT No.: PCT/EP2008/001771
§ 371 (c)(1),
(2), (4) Date: Jun. 3, 2010

(87) PCT Pub. No.: WO2008/110292
PCT Pub. Date: Sep. 18, 2008

(65) Prior Publication Data
US 2010/0239941 A1  Sep. 23, 2010

(30) Foreign Application Priority Data
Mar. 12, 2007  (DE) .......................... 10 2007 011 793

(51) Int. Cl.
*H01M 8/02* (2006.01)
*H01M 8/24* (2006.01)

(52) U.S. Cl.
USPC ............ 429/460; 429/469; 429/470; 429/511

(58) Field of Classification Search
USPC .......................... 429/460, 469, 470, 508, 511
See application file for complete search history.

(56) References Cited

U.S. PATENT DOCUMENTS

| | | | | |
|---|---|---|---|---|
| 4,345,009 A | * | 8/1982 | Fahle et al. | 429/460 |
| 4,414,294 A | | 11/1983 | Guthrie | |
| 4,430,390 A | * | 2/1984 | Fekete | 429/470 X |
| 4,849,308 A | * | 7/1989 | Schmitten et al. | 429/460 |
| 4,973,531 A | * | 11/1990 | Zaima et al. | 429/470 |
| 6,033,793 A | | 3/2000 | Woods et al. | |
| 6,087,033 A | | 7/2000 | Grune et al. | |
| 7,037,618 B2 | | 5/2006 | Andrews et al. | |
| 2006/0141325 A1 | | 6/2006 | Hansell et al. | |

FOREIGN PATENT DOCUMENTS

| | | |
|---|---|---|
| AT | 413009 B | 9/2005 |
| DE | 4336850 A1 | 5/1995 |

(Continued)

*Primary Examiner* — Stephen J. Kalafut
(74) *Attorney, Agent, or Firm* — Rader, Fishman & Grauer, PLLC (57) ABSTRACT

The invention relates to a sealing device for a fuel cell arrangement having a plurality of fuel cells combined to form a fuel cell stack (10), said fuel cells being permeable by the gas flows converted in the fuel cells transversely to the longitudinal direction of the fuel cell stack (10), and a gas distributor (20) provided on the longitudinal side of the fuel cell stack (10) for the supply and removal of the gas flows converted in the fuel cells, wherein the sealing device comprises a sealing frame (31) having a number of longitudinal sealing elements (32, 33, 34) disposed between the longitudinal edge of the gas distributor (20) and the fuel cell stack (10) and composed of a dielectric material, said sealing elements being disposed in a longitudinally movable fashion for the compensation of particularly thermally caused relative movements between the fuel cell stack (10) and the gas distributor (20). According to the invention, the longitudinal sealing elements (32, 33, 34) are closely disposed one next to the other in a gap-free fashion on the face, and a tension system having tension devices (40) is provided for producing a mechanical tension pressing the longitudinal sealing elements (32, 33, 34) together in the longitudinal direction between the ends of the sealing frame (31).

11 Claims, 7 Drawing Sheets

FOREIGN PATENT DOCUMENTS

| | | |
|---|---|---|
| DE | 4442285 C1 | 2/1996 |
| DE | 19650904 A1 | 6/1998 |
| DE | 10151452 A1 | 4/2003 |
| WO | WO-96/27113 A1 | 9/1996 |
| WO | WO-02/41436 A2 | 5/2002 |
| WO | WO-02/071523 | 9/2002 |
| WO | WO-03/105266 A1 | 12/2003 |

* cited by examiner

Fig. 7 ively to the longitudinal direction of the fuel cell stack (10), and a gas distributor (20) provided on the longitudinal side of the fuel cell stack (10) for the supply and removal of the gas flows converted in the fuel cells, wherein the sealing device comprises a sealing frame (31) having a number of longitudinal sealing elements (32, 33, 34) disposed between the longitudinal edge of the gas distributor (20) and the fuel cell stack (10) and composed of a dielectric material, said sealing elements being may be disposed in a longitudinally movable fashion for the compensation of particularly thermally caused relative movements between the fuel cell stack and the gas distributor.

SEALING DEVICE FOR A FUEL CELL ARRANGEMENT

CROSS-REFERENCE TO RELATED APPLICATIONS

Application PCT/EP2008/001771 claims priority for Application 10 2007 011 793.2 filed on Mar. 12, 2007 in Germany.

BACKGROUND

Figure 3:
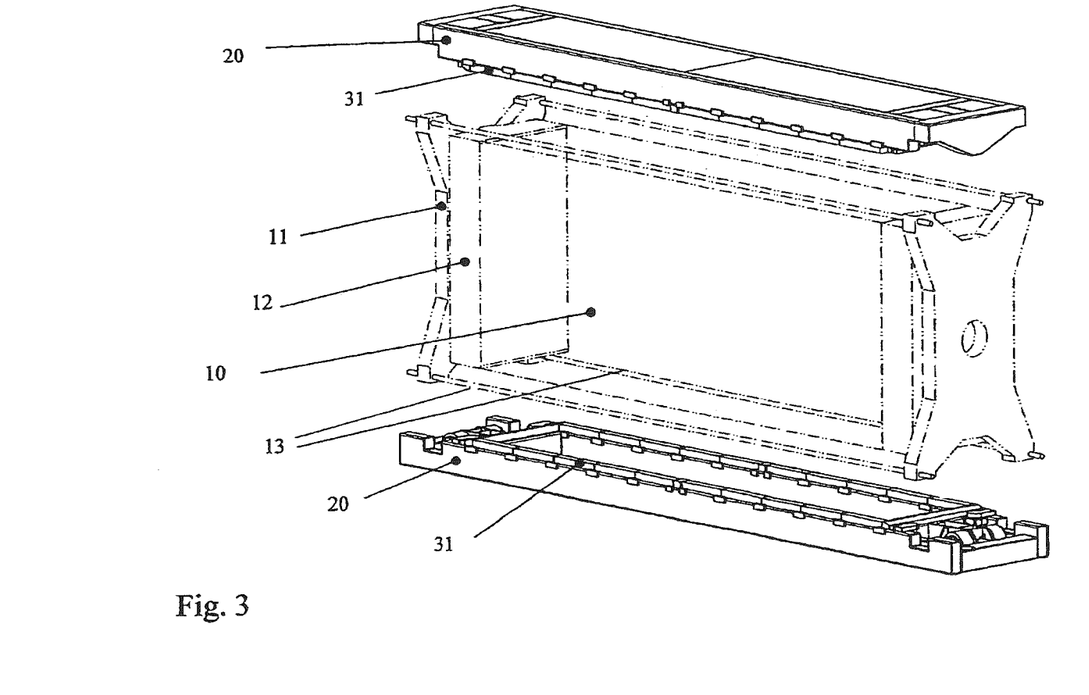
FIG. 3 is a three-dimensional exploded view of a fuel cell arrangement, in which the sealing device is provided in accordance with an embodiment of the invention.

As shown in FIG. 3, the invention relates to a sealing device for a fuel cell arrangement having a plurality of fuel cells combined to form a fuel cell stack (10), said fuel cells being permeable by the gas flows converted in the fuel cells transversely to the longitudinal direction of the fuel cell stack (10), and a gas distributor (20) provided on the longitudinal side of the fuel cell stack (10) for the supply and removal of the gas flows converted in the fuel cells, wherein the sealing device comprises a sealing frame (31) having a number of longitudinal sealing elements (32, 33, 34) disposed between the longitudinal edge of the gas distributor (20) and the fuel cell stack (10) and composed of a dielectric material, said sealing elements being may be disposed in a longitudinally movable fashion for the compensation of particularly thermally caused relative movements between the fuel cell stack and the gas distributor.

Fuel cell arrangements of the type for which the sealing device according to the invention is provided include a plurality of fuel cells combined to form a fuel cell stack, said fuel cells being permeable by the gas flows (fuel gas, oxidation gas, exhaust gas) converted in the fuel cells transversely to the longitudinal direction of the fuel cell stack. A gas distributor (manifold) is provided on the longitudinal side of the fuel cell stack for the supply and removal of the gas flows converted in the fuel cells, typically one gas distributor on two opposing longitudinal sides of the fuel cell stack. A sealing element, which mutually isolates these two elements, is provided between the fuel cell stack and the gas distributor. The sealing device traditionally includes a sealing frame, containing a number of longitudinal sealing elements disposed between the longitudinal edge of the gas distributor and the fuel cell stack and made from a dielectric material for electrical insulation.

When a fuel cell arrangement such as this is heated from ambient temperature to typically 650° C. or cooled, large changes in temperature can lead to significant relative movements of the dielectric sealing elements, so the elements are positioned between the fuel cell stack and the gas distributor in such a way that they are longitudinally movable to a certain degree, and able to absorb the relative movements. Usually, transverse sealing elements are positioned on the ends of the fuel cell stack between the transverse edges of the gas distributor and the fuel cell stack and they enclose the periphery of the sealing frame of the sealing device.

DETAILED DESCRIPTION

FIG. 3 shows a somewhat simplified three-dimensional exploded view of a fuel cell arrangement, which includes a plurality of fuel cells combined to form a fuel cell stack 10, said fuel cells being permeable by the gas flows converted in the fuel cells transversely to the longitudinal direction of fuel cell stack 10, vertically in FIG. 3. Fuel cell stack 10 is placed under tension with tension rods 13 between pressure plates 11 provided at the ends of the fuel cell stack under an intermediate layer of end plates 12. On each of the opposing longitudinal sides of the fuel cell stack is a gas distributor (manifold) 20, in FIG. 3 at top and bottom, which is used for the supply and removal of the gas flows converted in the fuel cells, namely fuel gas, oxidation gas and exhaust gas.

Previously, grooved bars (key fork connections) were inserted in grooves recessed in the abutting ends of the sealing elements to compensate for these relative movements between the sealing elements, and on which bars the sealing elements are guided laterally by fixing pins, which fit into round or elongated holes in the sealing elements. The disadvantages of this known solution lie in the fact that, due to the necessary fitting tolerance in this key fork connection, there is a constant, slow leak and also that in the event of a side impact, the sealing elements are in danger of suffering a break in the key fork connection.

Figures 1, 1A:
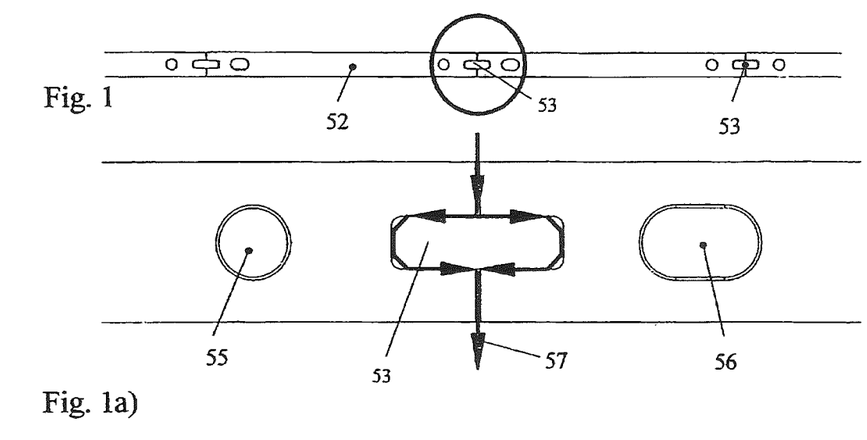
FIGS. 1 and 1a) are a plan view and an enlarged sectional representation of longitudinal sealing elements of a sealing device according to the prior art.
Figure 2:
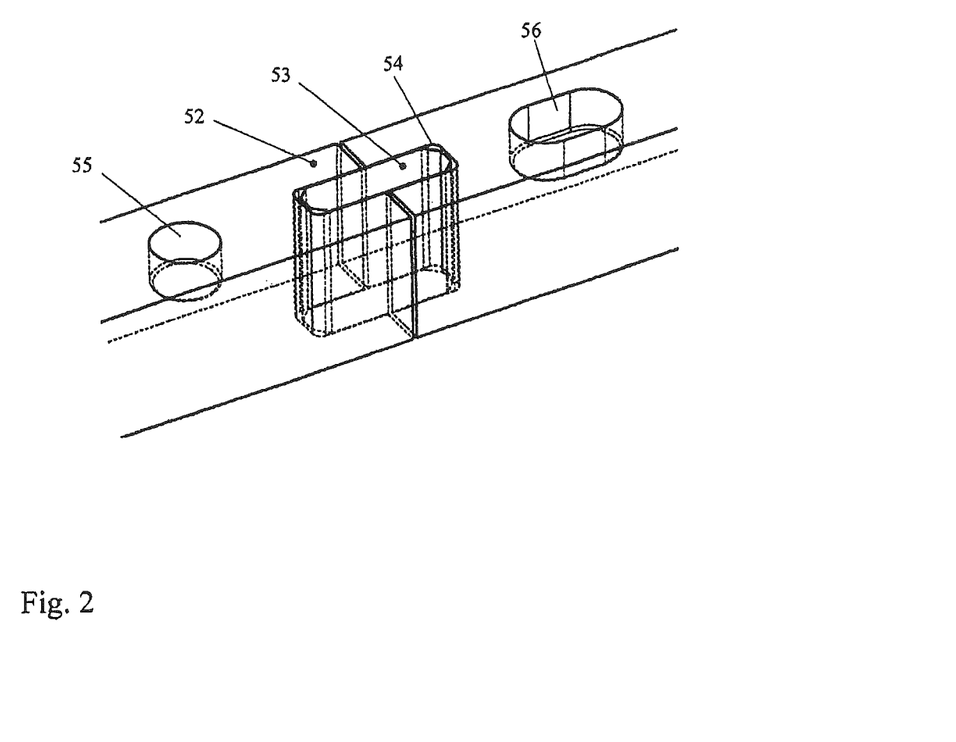
FIG. 2 is three-dimensional representation of a connection between longitudinal sealing elements of the type shown in FIGS. 1 and 1a) according to the prior art.

FIGS. 1 and 2 show a plan view (FIG. 1), an enlarged utility diagram (FIG. 1a), and a perspective view (FIG. 2) of details of traditionally used longitudinal sealing elements of a sealing device for such a fuel cell arrangement according to the prior art. Keys 53 (key fork connections) are inserted into key slots 54 on the abutting ends of the sealing elements. The sealing elements 52 are guided sideways by fixing pins, which are inserted in fixing bore holes or slots 55, 56 in the sealing elements. The aforementioned leak in the key fork connection is labeled 57.

The task of the present invention is to create an improved sealing device for a fuel cell arrangement of the type specified at the beginning In particular, a sealing device is to be created which is mechanically robust and in which a leak between the sealing elements is practically impossible.

The task is solved by a sealing device having the features described in Claim 1. Advantageous embodiments and refinements of the sealing device according to the invention are described in the subordinate claims.

With the invention, a sealing device is created for a fuel cell arrangement having a plurality of fuel cells combined to form a fuel cell stack, said fuel cells being permeable by the gas flows converted in the fuel cells transversely to the longitudinal direction of the fuel cell stack, and having a gas distributor provided on the longitudinal side of the fuel cell stack for the supply and removal of the gas flows converted in the fuel cells. The sealing device includes a sealing frame having a number of longitudinal sealing elements disposed between the longitudinal edge of the gas distributor and the fuel cell stack and composed of a dielectric material, said sealing elements being disposed in a longitudinally movable fashion for the compensation of particularly thermally caused relative movements between the fuel cell stack and the gas distributor. In accordance with the invention, it is designed in such a way that the longitudinal sealing elements are closely disposed one next to the other in a gap-free fashion on the face, and that a tension system having tension devices is provided for producing a mechanical tension pressing the longitudinal sealing elements together in the longitudinal direction between the ends of the sealing frame.

One advantage of the sealing device according to the invention is that the complex connections (key fork connections) described in the introduction consisting of key slots and keys adapted to fit in them are dispensed with, and with them their disadvantages, in particular a constant, slow leak and a certain sensitivity to breakage. The loading situation for the longitudinal sealing elements is better since they are only stressed under pressure.

According to a preferred embodiment of the sealing device of the invention, the tension system has tension devices positioned at both ends of the sealing frame, said tension devices producing a mechanical tension that presses the longitudinal sealing elements together longitudinally from the ends of the sealing frame towards the middle. This way the sealing mechanical tension pressing the longitudinal sealing elements together is produced equally and symmetrically from both ends of the sealing frame.

In this embodiment in particular, a longitudinal sealing element may be immovably positioned in the middle of the longitudinal extension of the sealing frame, toward which the longitudinally movably arranged longitudinal sealing elements are pressed together from the ends.

According to a preferred embodiment, the longitudinally movably arranged longitudinal sealing elements are laterally guided by guiding elements.

These guiding elements may be formed by limit stops on the sides of the longitudinal sealing elements.

The sealing element positioned immovably in the middle may be fixed laterally and longitudinally by limit stops.

According to one embodiment of the sealing device according to the invention, the tension system contains tension devices with at least one high pressure bellows, which may be pressurized by a fluid (gas or liquid) and which produces the mechanical tension pressing the longitudinal sealing elements together.

The tension elements may contain gear levers, which are inserted between the high pressure bellows and the longitudinal sealing elements positioned at the ends of the sealing frame and which strengthen the force produced by the high pressure bellows.

The high pressure bellows may be positioned transverse to the longitudinal direction of the sealing frame and the gear levers may be formed as a two-sided lever cranked at approx. 90°, which are positioned rotatably between the high pressure bellows and the ends of the sealing frame.

The transverse sealing elements may be positioned between the longitudinal sealing elements at the ends of the sealing frame and the tension devices of the tension system and placed under the mechanical tension pressing the longitudinal sealing elements together as well.

According to a further embodiment of the sealing device in accordance with the invention, the sealing frame may be made from non-variable parts for fuel cell stacks of different sizes in terms of the longitudinal expansion, such non-variable parts having a standardized length so that they correspond to a predetermined number of fuel cells.

In the following, an embodiment of the sealing device according to the invention will be explained with reference to the drawing.

Figure 4:
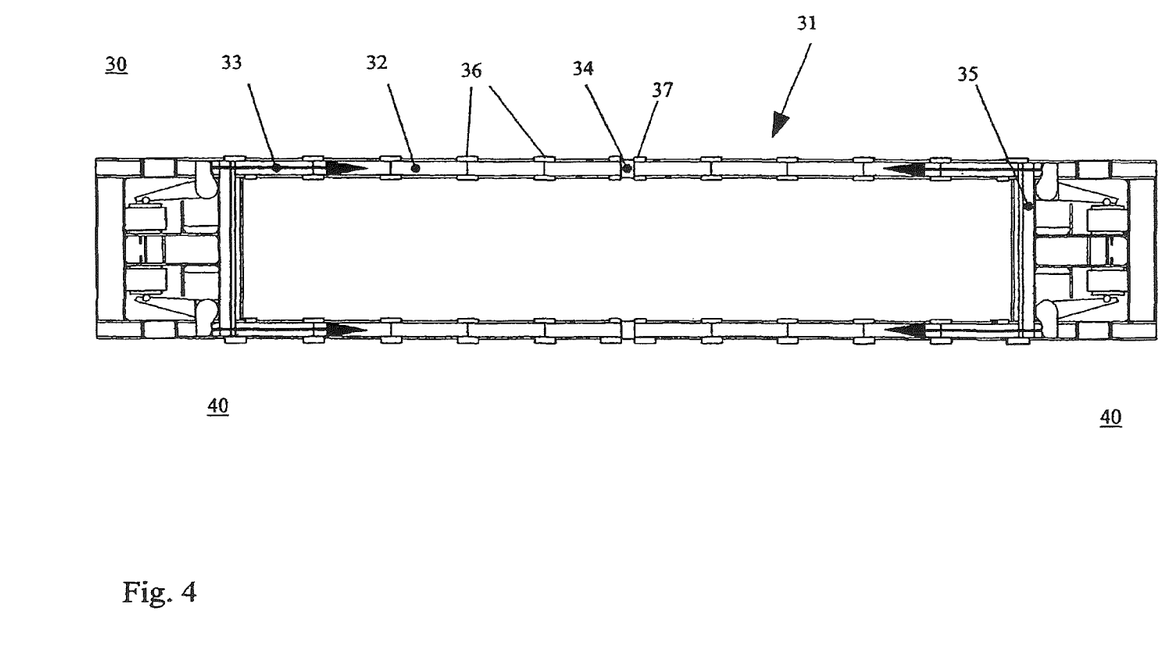
FIG. 4 is a plan view of a sealing device for a fuel cell arrangement in accordance with the embodiment of the invention.

To provide a seal between gas distributor 20 and fuel cell stack 10, a sealing device designated as a whole with reference numeral 30 is provided, and is shown in detail in a plan view in FIG. 4. This sealing device 30 is attached to gas distributor 20 and may be mounted on or detached from fuel cell stack 10 together with the gas distributor.

Sealing device 30 includes a sealing frame 31, which contains a plurality of longitudinal sealing elements 32, 33, 34, which are positioned along the longitudinal edge of gas distributor 20 and seal it against the corresponding longitudinal edge of fuel cell stack 10. At the transverse edges of the gas distributor 20 assigned to the ends of fuel cell stack 10 are transverse sealing elements 35, which enclose the periphery of sealing frame 31 at this point. Sealing elements 32, 33, 34, 35 consist of a dielectric material which is suitable for electrically insulating the individual fuel cells positioned in fuel cell stack 10.

To compensate for particularly thermally caused relative movements between fuel cell stack 10 and gas distributor 20, which occur particularly when the fuel cell arrangement is heated, typically from ambient temperature to approx. 650° C. or vice versa when cooling, longitudinal sealing elements 32, 33, 34 are positioned at least partially in a longitudinally movable fashion.

Longitudinal sealing elements 32, 33, 34 of sealing frame 31 are closely disposed one next to the other in a gap-free fashion on each face, and a tension system is provided, which is used to produce a mechanical tension pressing longitudinal sealing elements 32, 33, 34 together in the longitudinal direction between the ends of sealing frame 31.

In the embodiment of the figures, the tension system contains tension devices 40 positioned at both ends of sealing frame 31 relative to the longitudinal direction of fuel cell stack 10, which produce a mechanical tension pressing longitudinal sealing elements 32, 33, 34 from the ends of the sealing frame 31 or fuel cell stack 10 longitudinally toward the center.

Figure 5:
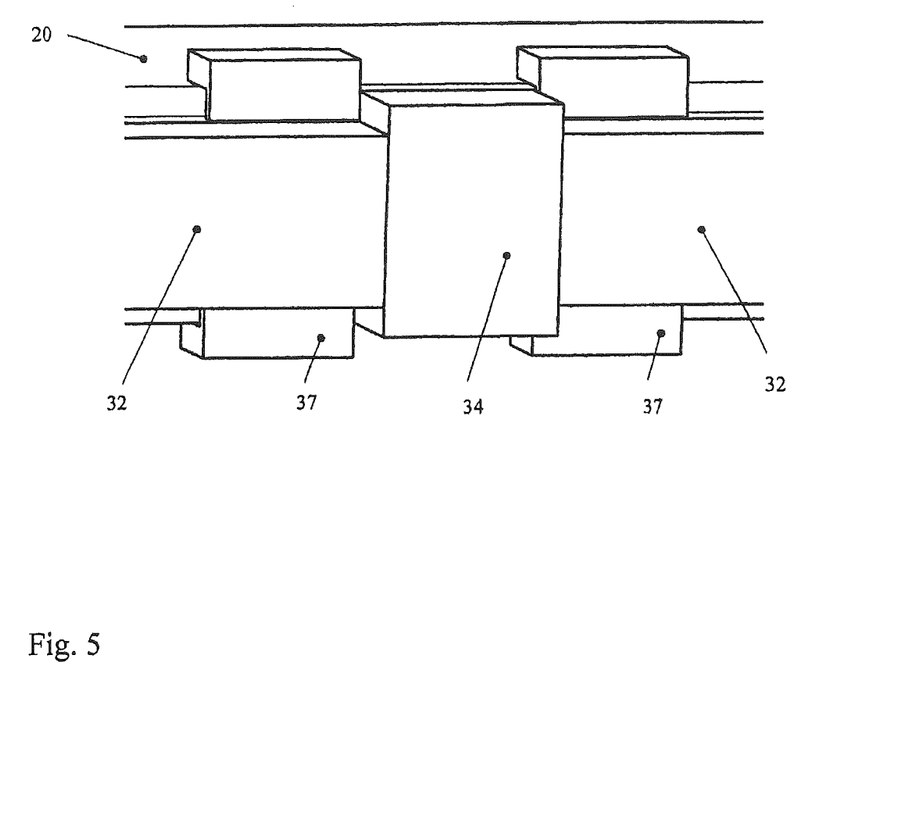
FIG. 5 is an enlarged detailed representation of a highlighted middle area of the sealing device of FIG. 4.

As is shown in FIG. 4, and particularly in the enlarged cutout representation of FIG. 5, a longitudinal sealing element 34 is positioned immovably or in fixed manner in the center of the longitudinal extension of sealing frame 31, toward which the other, longitudinally movably arranged longitudinal sealing elements 32, 33 are pressed together from the ends.

As is also shown in FIGS. 4 and 5, longitudinally movably arranged longitudinal sealing elements 32, 33 are guided laterally by guiding elements, which are formed by limit stops 36, 37 in the embodiment shown, and which are provided on both sides of longitudinal sealing elements 32, 33, 34. Sealing element 34 which is positioned immovably in the center is fixed laterally and longitudinally by limit stops 37.

Figure 6:
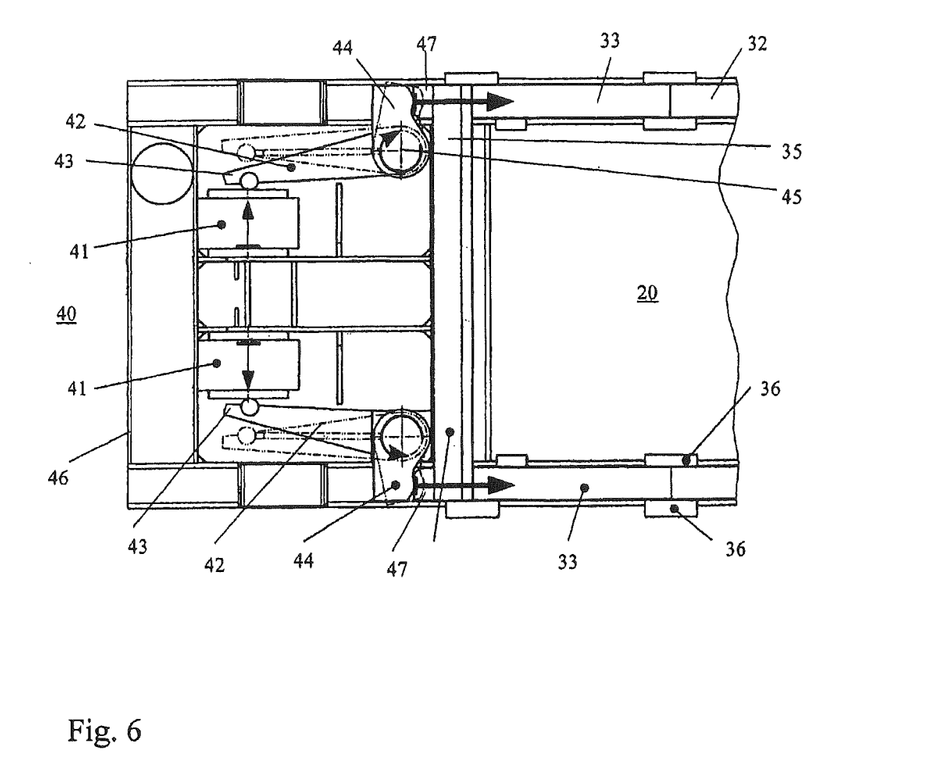
FIG. 6 is a plan view and FIG. 7 is a three-dimensional view of a highlighted end area of the sealing device of the embodiment of FIG. 4.
Figure 7:
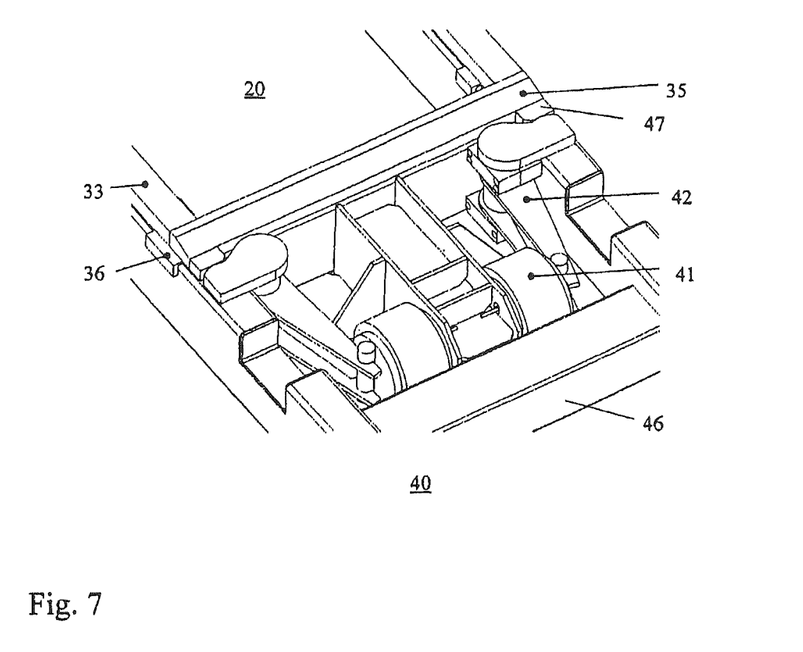

FIGS. 6 and 7 show a plan and three-dimensional view respectively of a tension device 40 of the tension system of sealing device 31. Tension device 40 is disposed in a housing 46 at the end of gas distributor 20 and contains the associated high pressure bellows 41, which may be charged with a fluid under pressure, such as compressed air or a hydraulic fluid, and which produce the mechanical tension pressing longitudinal elements 32, 33, 34. When pressurized, each high pressure bellows 41 produces movement in the direction of the arrows shown on high pressure bellows 41. High pressure bellows 41 are coupled by gear levers 42 with the long sides of sealing frame 31. These gear levers 42 are in the form of two-sided levers, which are bent approx. 90°, of which the longer, first leg 43 lies flush with high pressure bellows 41 while the shorter, second leg 44, acts on the sealing elements of sealing frame 31.

Gear lever 42 is positioned so as to be rotatable about a bearing axis 45 in the manner displayed by the curved arrows and strengthens the force produced by high pressure bellows 41, which then act as shown by the two following straight arrows on the sealing elements of sealing frame 31. This occurs indirectly via transverse sealing elements 35 contained in sealing frame 31 on the longitudinal sealing elements 33 on the ends of sealing frame 31. Transverse sealing elements 35 are thus placed under the mechanical tension that is acting on longitudinal sealing elements 32, 33, 34 by tension devices 40 so that here too a reliable sealing is ensured. Separators 47 are still provided between the second leg 44 of gear lever 42 and the transverse sealing element 35, said separators serving to ensure that the force is applied uniformly and wear is minimized.

Sealing frame 31 may be manufactured from non-variable parts for fuel cell stacks having different longitudinal extensions by using a different number of fuel cells, if the length of the parts of sealing frame 31 and longitudinal sealing elements 32, 33, 34 is standardized in such a way that they correspond with a predetermined number of fuel cells.

What is claimed as new and desired to be protected by Letters Patent of the United States is:

1. A fuel cell arrangement having a plurality of fuel cells combined to form a fuel cell stack, a sealing device for the fuel cell arrangement, and a gas distributor, wherein said fuel cells are permeable by gas flows converted in the fuel cells transversely to a longitudinal direction of the fuel cell stack, and wherein the gas distributor is provided on a longitudinal side of the fuel cell stack for supply and removal of the gas flows converted in the fuel cells, and wherein the sealing device comprises a sealing frame having a number of longitudinal sealing elements disposed between a longitudinal edge of the gas distributor and the fuel cell stack and is composed of a dielectric material, said sealing elements being disposed in a longitudinally movable fashion for compensation of particularly thermally caused relative movements between the fuel cell stack and the gas distributor,
    wherein the longitudinal sealing elements are closely disposed, one next to the other, in a gap-free fashion on each face, and a tension system having tension devices is provided for producing a mechanical tension pressing the longitudinal sealing elements together in the longitudinal direction between ends of the sealing frame.

2. A fuel cell arrangement according to claim 1,
    wherein the tension devices are positioned at both ends of the sealing frame, which produce a mechanical tension pressing together of the longitudinal sealing elements from the ends of the sealing frame longitudinally toward the center.

3. A fuel cell arrangement according to claim 2,
    wherein the longitudinal sealing element is positioned immovably or in fixed manner in the center of the longitudinal extension of the sealing frame, toward which other, longitudinally movably arranged longitudinal sealing elements are pressed together from the ends.

4. A fuel cell arrangement according to claim 1,
    wherein the longitudinally movably arranged longitudinal sealing elements are guided laterally by guiding elements.

5. A fuel cell arrangement according to claim 4,
    wherein the guiding elements are formed by limit stops.

6. A fuel cell arrangement according to claim 3 or 5,
    wherein the sealing element positioned immovably in the center is fixed laterally and longitudinally by limit stops.

7. A fuel cell arrangement according to claim 1,
    wherein the tension system contains tension devices with high pressure bellows, which may be charged with a fluid under pressure, and which produce the mechanical tension pressing longitudinal elements.

8. A fuel cell arrangement according to claim 7,
    wherein the tension devices contain gear levers which are positioned between the high pressure bellows and the longitudinal sealing elements at an end of the sealing frame and strengthen a force produced by the high pressure bellows.

9. A fuel cell arrangement according to claim 8,
    wherein the high pressure bellows are positioned transversely to the longitudinal direction of the sealing frame, and the gear levers are in the form of two-sided levers, which are bent approximately 90°, and are positioned between the high pressure bellows and ends of the sealing frame so as to be rotatable.

10. A fuel cell arrangement according to claim 1,
    wherein transverse sealing elements are arranged between the longitudinal sealing elements on the ends of the sealing frame and the tension devices of the tension system and are placed under the mechanical tension that is acting on the longitudinal sealing elements.

11. A fuel cell arrangement according to claim 1,
    wherein the sealing frame is made from non-variable parts for fuel cell stacks of different sizes in terms of the longitudinal expansion, such non-variable parts having a standardized length so that the non-variable parts correspond to a predetermined number of fuel cells.

* * * * *